US012692077B2

(12) United States Patent
Wang

(10) Patent No.: US 12,692,077 B2
(45) Date of Patent: Jul. 28, 2026

(54) RACK, WAREHOUSING APPARATUS, CONTROL METHOD, APPARATUS, DEVICE AND READABLE STORAGE MEDIUM

(71) Applicant: SHANGHAI QUICKTRON INTELLIGENT TECHNOLOGY CO., LTD., Shanghai (CN)

(72) Inventor: Xinhao Wang, Shanghai (CN)

(73) Assignee: SHANGHAI QUICKTRON INTELLIGENT TECHNOLOGY CO., LTD., Shanghai (CN)

( * ) Notice: Subject to any disclaimer, the term of this patent is extended or adjusted under 35 U.S.C. 154(b) by 352 days.

(21) Appl. No.: 18/417,713

(22) Filed: Jan. 19, 2024

(65) Prior Publication Data

US 2024/0150121 A1     May 9, 2024

Related U.S. Application Data

(63) Continuation of application No. PCT/CN2022/101190, filed on Jun. 24, 2022.

(30) Foreign Application Priority Data

Jul. 22, 2021     (CN) ......................... 202110833027.9
Jul. 22, 2021     (CN) ......................... 202121679914.7

(51) Int. Cl.
*B65G 1/06*          (2006.01)
*B65G 1/04*          (2006.01)
*B65G 1/137*         (2006.01)

(52) U.S. Cl.
CPC ......... *B65G 1/1373* (2013.01); *B65G 1/0492* (2013.01)

(58) Field of Classification Search
CPC ...... B65G 1/1373; B65G 1/0492; B65G 1/02; B65G 1/06; B65G 1/137; B65G 1/04
See application file for complete search history.

(56) References Cited

FOREIGN PATENT DOCUMENTS

| | | |
|---|---|---|
| BE | 904683 A | 8/1986 |
| CN | 105151608 A | 12/2015 |
| CN | 109987366 A | 7/2019 |

(Continued)

OTHER PUBLICATIONS

Decision to Grant a Patent dated Jan. 28, 2025 for Japanese Application No. 2024-502698.

(Continued)

*Primary Examiner* — Justin Holmes

(57)          ABSTRACT

A rack, a warehousing apparatus, a control method, an apparatus, a device and a readable storage medium, in which the rack includes: a plurality of first uprights and a plurality of second uprights arranged at intervals along a circumference of the rack, the first upright being located between two of the second uprights in a width direction of the rack; at least one temporary storage layer plate including a first cross beam arranged along a horizontal direction and a plurality of temporary storage members arranged at intervals along two sides of the first cross beam, and the temporary storage layer plate being configured to provide a plurality of temporary storage positions; and at least one storage layer plate spaced apart from the temporary storage layer plate in a vertical direction through the first uprights and the second uprights, and configured to provide a plurality of storage positions.

18 Claims, 6 Drawing Sheets

130

(56)                    References Cited

FOREIGN PATENT DOCUMENTS

| | | | | | |
|----|--------------|---|---------|---|-----------|
| CN | 210162597 | U | | 3/2020 | |
| CN | 210162598 | U | | 3/2020 | |
| CN | 111232530 | A | | 6/2020 | |
| CN | 111361908 | A | * | 7/2020 | ........... B65G 1/1373 |
| CN | 111453275 | A | | 7/2020 | |
| CN | 211224681 | U | | 8/2020 | |
| CN | 111792262 | A | | 10/2020 | |
| CN | 112478557 | A | | 3/2021 | |
| CN | 112478560 | A | | 3/2021 | |
| CN | 112693796 | A | | 4/2021 | |
| CN | 112693800 | A | | 4/2021 | |
| CN | 112830137 | A | | 5/2021 | |
| CN | 113104470 | A | | 7/2021 | |
| CN | 113548349 | A | | 10/2021 | |
| CN | 215556226 | U | | 1/2022 | |
| JP | H0680222 | A | | 3/1994 | |
| JP | 2017165517 | A | | 9/2017 | |
| WO | WO2010046809 | A1 | | 4/2010 | |
| WO | WO2020049862 | A1 | | 3/2020 | |

OTHER PUBLICATIONS

The First Examination Opinion Notice dated Dec. 12, 2024 for Chinese Application No. 202110833027.9.
International Search Report for related PCT/CN2023/101190, mailed Sep. 15, 2022.

* cited by examiner

130

200

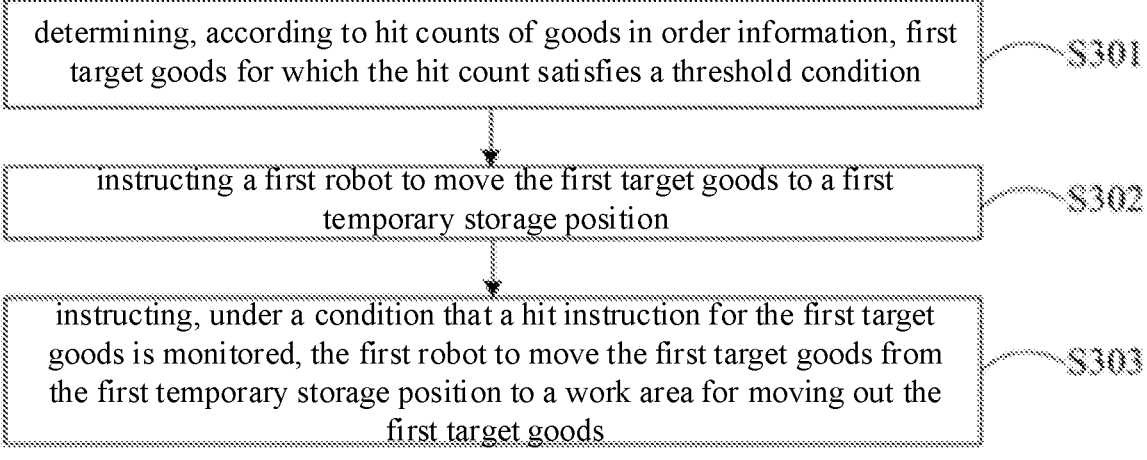

determining, according to hit counts of goods in order information, first target goods for which the hit count satisfies a threshold condition ~~S301 instructing a first robot to move the first target goods to a first temporary storage position ~~S302 instructing, under a condition that a hit instruction for the first target goods is monitored, the first robot to move the first target goods from the first temporary storage position to a work area for moving out the first target goods ~~S303

Fig. 3 determining, according to the hit counts of goods in the order information, second target goods for which the hit count does not satisfy the threshold condition ~~S401 instructing the first robot to move the second target goods to a second temporary storage position ~~S402 instructing, under a condition that a moving completion signal sent by the first robot is received, a second robot to move the second target goods from the second temporary storage position to a target storage position corresponding to the second target goods ~~S403

Fig. 4A

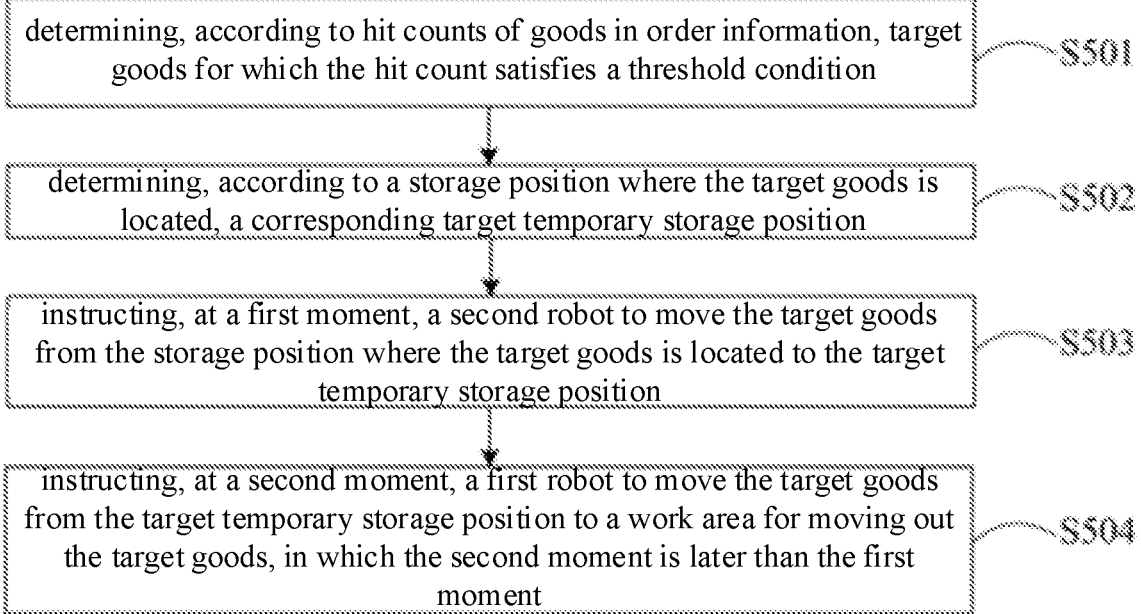

determining, according to hit counts of goods in order information, target goods for which the hit count satisfies a threshold condition ~S501 determining, according to a storage position where the target goods is located, a corresponding target temporary storage position ~S502 instructing, at a first moment, a second robot to move the target goods from the storage position where the target goods is located to the target temporary storage position ~S503 instructing, at a second moment, a first robot to move the target goods from the target temporary storage position to a work area for moving out the target goods, in which the second moment is later than the first moment ~S504

Fig. 5

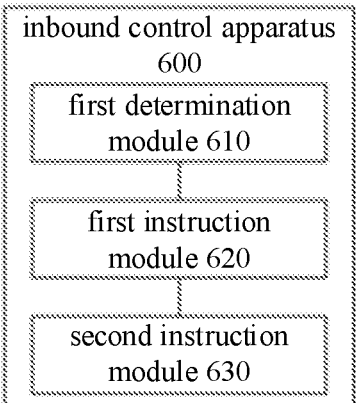

inbound control apparatus
600 first determination
module 610 first instruction
module 620 second instruction
module 630

Fig. 6

RACK, WAREHOUSING APPARATUS, CONTROL METHOD, APPARATUS, DEVICE AND READABLE STORAGE MEDIUM

CROSS REFERENCE TO RELATED APPLICATION

The present application is a continuation of International Application No. PCT/CN2022/101190 filed on Jun. 24, 2022, which claims priority to Chinese Patent Application No. 202110833027.9 filed on Jul. 22, 2021, and titled "RACK, WAREHOUSING APPARATUS, CONTROL METHOD, APPARATUS, DEVICE AND READABLE STORAGE MEDIUM", and Chinese Patent Application No. 202121679914.7 filed on Jul. 22, 2021, and titled "RACK AND WAREHOUSING APPARATUS", all of which are incorporated herein by reference in their entireties.

TECHNICAL FIELD

The present application relates to the field of warehousing technology, and particularly to a rack, a warehousing apparatus, a control method, an apparatus, a device and a readable storage medium.

BACKGROUND

A rack is a device for storing goods three-dimensionally, which can increase the utilization efficiency of the warehouse.

At present, in order to improve the inbound and outbound efficiency of goods, a travel passage for a transport robot to travel when loading goods is generally arranged at the bottom of the rack, which occupies the space of the rack and limits the temporary storage capacity of the rack, and thus the space is wasted when the goods traffic is low.

SUMMARY

One of the objects of the present application is to provide a rack, a warehousing apparatus, a control method, an apparatus, a device and a readable storage medium, which at least solves the problem that the warehouse space is wasted when the traffic of the rack is low.

In a first aspect, embodiments of the present application provide a rack including: a plurality of first uprights and a plurality of second uprights arranged at intervals along a circumference of the rack, the first upright being located between two of the second uprights in a width direction of the rack; at least one temporary storage layer plate including a first cross beam arranged along a horizontal direction and a plurality of temporary storage members arranged at intervals along two sides of the first cross beam, two ends of the first cross beam being respectively arranged at two of the first uprights, the temporary storage member including two support arms and a fork slot formed between the two support arms, and the temporary storage layer plate being configured to provide a plurality of temporary storage positions; and at least one storage layer plate spaced apart from the temporary storage layer plate in a vertical direction through the first uprights and the second uprights, and configured to provide a plurality of storage positions.

In one implementation, the plurality of temporary storage members are detachable from the first cross beam.

In a second aspect, the embodiments of the present application provide a warehousing apparatus including the rack according to any of the above implementations.

In a third aspect, the embodiments of the present application provide an inbound control method applicable to the rack according to any of the above implementations, and the control method includes: determining, according to hit counts of goods in order information, first target goods for which the hit count satisfies a threshold condition; instructing a first robot to move the first target goods to a first temporary storage position; and instructing, under a condition that a hit instruction for the first target goods is monitored, the first robot to move the first target goods from the first temporary storage position to a work area for moving out the first target goods.

In a fourth aspect, the embodiments of the present application provide an outbound control method applicable to the rack according to any of the above implementations, and the control method includes: determining, according to hit counts of goods in order information, target goods for which the hit count satisfies a threshold condition; determining, according to a storage position where the target goods is located, a corresponding target temporary storage position; instructing, at a first moment, a second robot to move the target goods from the storage position where the target goods is located to the target temporary storage position; and instructing, at a second moment, a first robot to move the target goods from the target temporary storage position to a work area for moving out the target goods, in which the second moment is later than the first moment.

In a fifth aspect, the embodiments of the present application provide an inbound control apparatus applicable to the rack according to any of the above implementations, and the control apparatus includes: a first determination module configured to determine, according to hit counts of goods in order information, first target goods for which the hit count satisfies a threshold condition; a first instruction module configured to instruct a first robot to move the first target goods to a first temporary storage position; and a second instruction module configured to instruct, under a condition that a hit instruction for the first target goods is monitored, the first robot to move the first target goods from the first temporary storage position to a work area for moving out the first target goods.

In a sixth aspect, the embodiments of the present application provide an outbound control apparatus applicable to the rack according to any of the above implementations, and the control apparatus includes: a third determination module configured to determine, according to hit counts of goods in order information, target goods for which the hit count satisfies a threshold condition; a fourth determination module configured to determine, according to a storage position where the target goods is located, a corresponding target temporary storage position; a fifth instruction module configured to instruct, at a first moment, a second robot to move the target goods from the storage position where the target goods is located to the target temporary storage position; and a sixth instruction module configured to instruct, at a second moment, a first robot to move the target goods from the target temporary storage position to a work area for moving out the target goods, in which the second moment is later than the first moment.

In a seventh aspect, the embodiments of the present application provide an electronic device including a memory and a processor; in which the memory and the processor communicate with each other through an internal connection path, the memory is configured to store instructions, the processor is configured to execute the instructions stored by the memory, and the processor, when executing the instructions stored by the memory, performs the method according to any of the implementations in the above aspects.

In an eighth aspect, the embodiments of the present application provide a computer readable storage medium storing a computer program, in which the computer program, when executed on a computer, implements the method according to any of the implementations in the above aspects.

The advantages or beneficial effects of the above technical solutions include at least: by arranging a plurality of temporary storage members at intervals along the two sides of the first cross beam, the number of temporary storage positions that can be provided by the same temporary storage layer plate is increased, and thus the temporary storage capacity of the rack can be increased, which is beneficial to reduce the number of the second robots by prolonging the work time of the second robots, so that the space of the rack can be fully used when the goods traffic is low, and a waste of the space resource of the rack is avoided.

The above overview is merely for the purpose of the specification and not intended to be limiting in any way. In addition to the exemplary aspects, implementations and features described above, further aspects, implementations and features of the present application will become apparent by reference to the accompanying drawings and the following detailed description.

BRIEF DESCRIPTION OF THE DRAWINGS

In the accompanying drawings, the same reference numerals throughout a plurality of the accompanying drawings denote the same or similar components or elements, unless otherwise specified. The accompanying drawings are not necessarily drawn to scale. It is understood that these accompanying drawings depict only some implementations according to the present application and should not be considered as limiting of the scope of the present application.

FIG. 3 shows a schematic flowchart of an inbound control flow according to a third embodiment of the present application;

FIG. 4A shows a schematic flowchart of an inbound control flow according to a fourth embodiment of the present application;

FIG. 5 shows a schematic flowchart of an outbound control method according to a fifth embodiment of the present application;

FIG. 6 shows a structural block diagram of an inbound control apparatus according to a sixth embodiment of the present application;

DETAILED DESCRIPTION

In the following, only certain exemplary embodiments are briefly described. As will be recognized by those skilled in the art, the described embodiments can be modified in various different ways without departing from the gist or scope of the present application. Therefore, the accompanying drawings and the description are considered as exemplary, but not limiting.

Figure 1A:
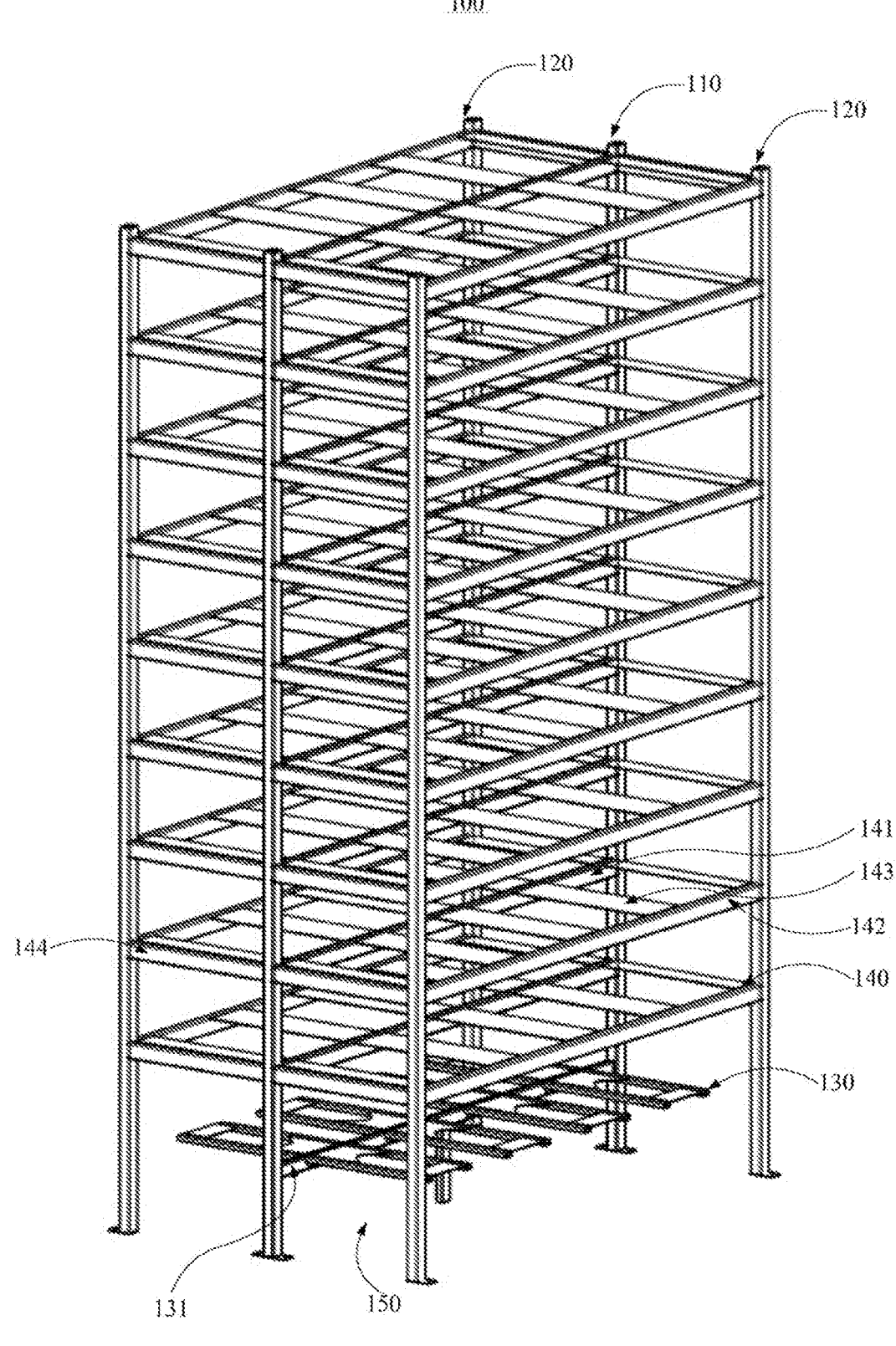
FIG. 1A shows a schematic structural diagram of a rack according to a first embodiment of the present application.
Figures 1B, 2:
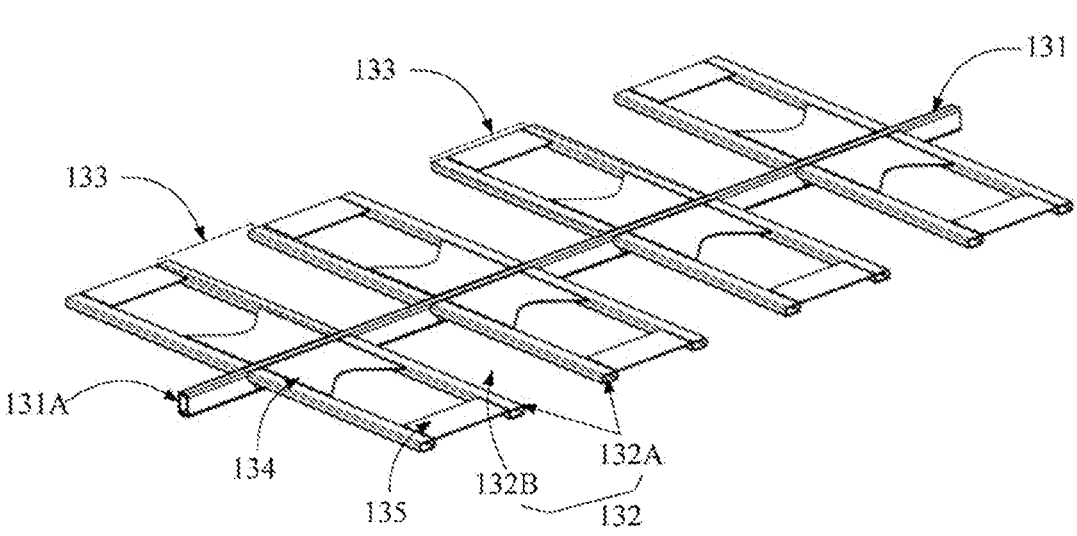
FIG. 1B shows a schematic structural diagram of a temporary storage layer plate according to the first embodiment of the present application.
FIG. 2 shows a schematic structural diagram of a warehousing apparatus according to a second embodiment of the present application.

FIG. 1A shows a schematic structural diagram of a rack 100 according to a first embodiment of the present application. FIG. 1B shows a schematic structural diagram of a temporary storage layer plate 130 according to the first embodiment of the present application. As shown in FIGS. 1A and 1B, the rack 100 may include: a plurality of first uprights 110, a plurality of second uprights 120, at least one temporary storage layer plate 130, and at least one storage layer plate 140.

The plurality of first uprights 110 and the plurality of second uprights 120 are arranged at intervals along a circumference of the rack 100, and the first upright 110 is located between two adjacent second uprights 120 in a width direction of the rack 100.

The temporary storage layer plate 130 includes a first cross beam 131 arranged along a horizontal direction and a plurality of temporary storage members 132 arranged at intervals along two sides of the first cross beam 131, two ends of the first cross beam 131 are respectively arranged at two of the first uprights 110, the temporary storage member 132 includes two support arms 132A and a fork slot 132B formed between the two support arms 132A, and the temporary storage layer plate 130 is configured to provide a plurality of temporary storage positions 133 as shown by the dashed boxes in FIG. 1B.

The storage layer plate 140 is spaced apart from the temporary storage layer plate 130 in a vertical direction through the first uprights 110 and the second uprights 120, and configured to provide a plurality of storage positions (not labeled in the accompanying drawings). Exemplarily, the storage layer plate 140 includes a second cross beam 141, a plurality of third cross beams 142 and a plurality of support plates 143, which are arranged at intervals along the horizontal direction, in which two ends of the second cross beam 141 are respectively arranged at two of the first uprights 110, the second cross beam 141 is parallel to the first cross beam 131, two ends of the third cross beam 142 are respectively arranged at two of the second uprights 120, the third cross beam 142 is parallel to second cross beam 141, and the plurality of support plates 143 are arranged at intervals between the second cross beam 141 and the third cross beams 142 along a length direction of the rack 100. Optionally, the storage layer plate 140 may further include a fourth cross beam 144 arranged between the adjacent first upright 110 and second upright 120, and the fourth cross beam 144 is perpendicular to the second cross beam 141.

In an application scenario, and reference is further made to FIG. 2, when goods 230 are to be stored, a first robot 220 puts a fork arm 221 into the fork slot 132B of the temporary storage layer plate 130, lowers the height, and places the carried goods 230 on the temporary storage layer plate 130 for temporary storage, and the goods 230 on the temporary storage layer plate 130 are moved, by a second robot (not shown in the accompanying drawings), onto the storage layer plate 140 for storage. When the goods 230 are to be taken, the second robot moves the goods 230 on the storage layer plate 140 onto the temporary storage layer plate 130 for temporary storage, and the first robot 220 puts the fork arm 221 into the fork slot 132B of the temporary storage layer plate 130, lifts the goods 230 up, and moves the goods 230 away from the temporary storage layer plate 130. The first robot 220 and the second robot transfer the goods 230 using the temporary storage layer plate of the rack 100.

Herein, the first robot 220 may be an Automated Guided Vehicle (AGV) including the fork arm 221 which may be arranged at the top or a side of the first robot 220, and the arrangement of the fork arm 221 of the first robot 220 is not limited in the embodiments of the present application. The second robot may be an AGV vehicle including an elevator mechanism and an access mechanism, or may be a stacker and the like, and the type of the second robot is not limited in the embodiments of the present application, as long as the second robot is able to access and move the goods 230.

In the above solution, by arranging a plurality of temporary storage members 132 at intervals along the two sides of the first cross beam 131, the number of temporary storage positions 133 that can be provided by the same temporary storage layer plate 130 is increased, and thus the temporary storage capacity of the rack 100 can be increased, which is beneficial to reduce the number of the second robots by prolonging the work time of the second robots, so that the space of the rack 100 can be fully used when the goods traffic is low, and a waste of the space resource of the rack 100 is avoided.

Further, since the cost of the second robot is usually several times or tens of times higher than the cost of the first robot 220, by making full use of the second robot, a waste of resources can be avoided and the inbound and outbound costs can be reduced.

In an optional implementation, the temporary storage positions 133 provided by the temporary storage layer plate 130 may also be used as storage positions to increase the number of storage positions in the rack 100.

In an implementation, as shown in FIGS. 1A and 1B, the plurality of temporary storage members 132 are detachable from the first cross beam 131.

Exemplarily, the temporary storage members 132 at a first side 131A of the first cross beam 131 may be detached, so that a travel passage for the first robot 220 to travel is formed between the first side 131A of the first cross beam 131 and the second upright 120, and thus the first robot 220 and the second robot can be prevented from sharing the travel passage, and the rack 100 is applicable to a scenario with high goods traffic.

Based on this, since the temporary storage members 132 can be arranged at one or two sides of the first cross beam 131, the rack 100 can be flexibly applied to scenarios with high goods traffic or low goods traffic.

In an implementation, the first cross beam 131 is detachable from the first uprights 110. In this way, the temporary storage layer plate 130 may be or may not be arranged on the rack 100 according to actual needs, so that the rack 100 is applicable to different inbound and outbound requirements, which is beneficial to improve the diversity of utilization of the rack 100.

In an implementation, as shown in FIG. 1B, the temporary storage position 133 is formed by the support arms 132A of the temporary storage member 132 or formed by adjacent support arms 132A from adjacent temporary storage members 132.

In one example, the temporary storage position 133 may be formed by the two support arms 132A of the temporary storage member 132 and an area enclosed by the two support arms 132A. As shown by the temporary storage position 133 on the left in FIG. 1B, the fork slot 132B of this temporary storage layer plate 130 is located between the two support arms 132A, which is beneficial for the temporary storage layer plate 130 to cooperate with a first robot 220 including a single fork arm 221. For example, the first robot 220 aligns, from a side corresponding to the fork slot 132B of the temporary storage layer plate 130, the single fork arm 221 with the fork slot 132B of the temporary storage layer plate 130, so that the fork arm 221 is directly put into the fork slot 132B for accessing the goods 230.

In another example, the temporary storage position 133 is formed by adjacent support arms 132A from adjacent temporary storage members 132 and an area enclosed by the adjacent support arms 132A. As shown by the temporary storage position 133 on the right in FIG. 1B, the fork slots 132B of this temporary storage layer plate 130 are located at two sides of the temporary storage position 133, which may be beneficial for the temporary storage layer plate 130 to cooperate with a first robot 220 including two fork arms 221. For example, the first robot 220 aligns, from a side corresponding to the fork slots 132B of the temporary storage layer plate 130, the two fork arms 221 with the fork slots 132B located at two sides of the temporary storage position 133, so that the two fork arms 221 are directly put into the two fork slots 132B for accessing the goods 230.

In an implementation, as shown in FIGS. 1A and 1B, the temporary storage layer plate 130 further includes: a plurality of fixing plates 134 and a plurality of wedge plates 135.

The fixing plates 134 are each connected between adjacent temporary storage members 132 and connected to the first cross beam 131. This not only enhances the strength between the support arm 132A and the first cross beam 131, but also improves the stability of the support arm 132A.

The wedge plates 135 are each connected between adjacent temporary storage members 132 and arranged at an end of the support arm 132A away from the first cross beam 131. For example, the wedge plate 135 is connected between outer ends of the adjacent support arms 132A of the adjacent temporary storage members 132, so that the connection strength between the adjacent support arms 132A of the adjacent temporary storage members 132 can be increased, which is beneficial to improve the carrying capacity of the temporary storage members 132.

In an implementation, reference is made to FIGS. 1A, 1B, and 2 together, an access passage 150 for placing the first robot 220 is formed under the temporary storage layer plate 130; and when the goods 230 are to be accessed and the first robot 220 is located in the access passage 150, the fork slot 132B cooperates with the fork arm 221 on the first robot 220 to access the goods 230. In this way, it can be avoided that the first robot 220 occupies the space outside the rack 100 when accessing the goods 230, and thus the utilization rate of the space is increased.

In an implementation, the access passage 150 is further configured for the first robot 220 to travel without goods. Exemplarily, when the first robot 220 carries no goods, the fork arm 221 of the first robot 220 does not carry the goods 230, and thus the height of the first robot 220 is low and the first robot 220 can travel in the access passage 150, so that the first robot 220, when carrying no goods, may not share the travel passage with the second robot, which is beneficial to improve the inbound and outbound efficiency.

In an implementation, reference is made to FIGS. 1A, 1B and 2 together, the second uprights 120 are arranged at the periphery of the temporary storage layer plate 130 and the storage layer plate 140, and a first travel passage (not labeled in the accompanying drawings) for the first robot 220 to travel is formed at a side of the second uprights 120 away from the temporary storage layer plate 130. In this way, when the first robot 220 carries the goods 230, the first robot 220 may travel along the first travel passage to move the goods 230.

FIG. 2 shows a schematic structural diagram of a warehousing apparatus 200 according to a second embodiment of the present application. As shown in FIG. 2, the warehousing apparatus 200 may include: a plurality of racks 100 according to any of the above implementations, and a second travel passage 210 for the second robot to travel, the second travel passage 210 is formed between adjacent racks 100, and the second robot is configured to move goods 230 between the temporary storage layer plate 130 and the storage layer plate 140.

Exemplarily, a projection area of the second travel passage 210 along the vertical direction may overlap a projection area of the first travel passage along the vertical direction, so that the first robot 220, when carrying the goods 230, shares the travel passage with the second robot, and thus the warehousing apparatus 200 is applicable to a scenario with low goods traffic.

The second robot may move goods between the temporary storage layer plate 130 and the storage layer plate 140 of a same rack 100 or adjacent racks 100.

FIG. 3 shows a schematic flowchart of an inbound control method according to a third embodiment of the present application. The inbound control method is applicable to the rack according to any of the above implementations. As shown in FIG. 3, the control method may include the following steps S301-S303.

S301: determining, according to hit counts of goods in order information, first target goods for which the hit count satisfies a threshold condition.

Herein, the order information may include the required quantity of goods stored in a plurality of historical order information or an order pool.

In one example, determining the first target goods includes: determining hit counts of goods in the historical order information; and determining goods for which the hit count is equal to or greater than a count threshold as the first target goods. In this way, the first target goods may be predicted using the historical order information.

In another example, determining the first target goods includes: determining goods for which a required quantity of goods in the order pool is equal to or greater than a quantity threshold as the first target goods. In this way, the first target goods may be determined using the required quantity of goods in the order pool.

S302: instructing a first robot to move the first target goods to a first temporary storage position.

S303: instructing, under a condition that a hit instruction for the first target goods is monitored, the first robot to move the first target goods from the first temporary storage position to a work area for moving out the first target goods.

In the above solution, the first robot is instructed to move the first target goods, for which the hit count satisfies the threshold condition, to the first temporary storage position for temporary storage, while the second robot is not instructed to move the first target goods from the first temporary storage position to the target storage position, so that the operation of the second robot for moving the first target goods between the first temporary storage position and the target storage position can be omitted, the transfer frequency of the first target goods is reduced, and thus, under the condition that the hit instruction of the first target goods is monitored, the first robot can be immediately instructed to move the first target goods from the first temporary storage position to the work area for moving out the first target goods, which is beneficial to improve the inbound and outbound efficiency in a scenario with low goods traffic.

FIG. 4A shows a schematic flowchart of an inbound control method according to a fourth embodiment of the present application. As shown in FIG. 4A, the control method may further include the following steps S401-S403.

S401: determining, according to the hit counts of goods in the order information, second target goods for which the hit count does not satisfy the threshold condition.

Herein, determining the second target goods may include: determining goods for which the hit count in the historical order information is less than the count threshold as the second target goods, or determining goods for which the required quantity of goods in the order pool is less than the quantity threshold as the second target goods.

S402: instructing the first robot to move the second target goods to a second temporary storage position.

S403: instructing, under a condition that a moving completion signal sent by the first robot is received, a second robot to move the second target goods from the second temporary storage position to a target storage position corresponding to the second target goods.

In the above solution, the first robot is instructed to move the second target goods, for which the hit count does not satisfy the threshold condition, to the second temporary storage position, and under the condition that the moving completion signal sent by the first robot is received, the second robot is immediately instructed to move the second target goods from the second temporary storage position to the corresponding target storage position for storage, so as to avoid that the second target goods occupies the temporary storage position.

Figure 4B:
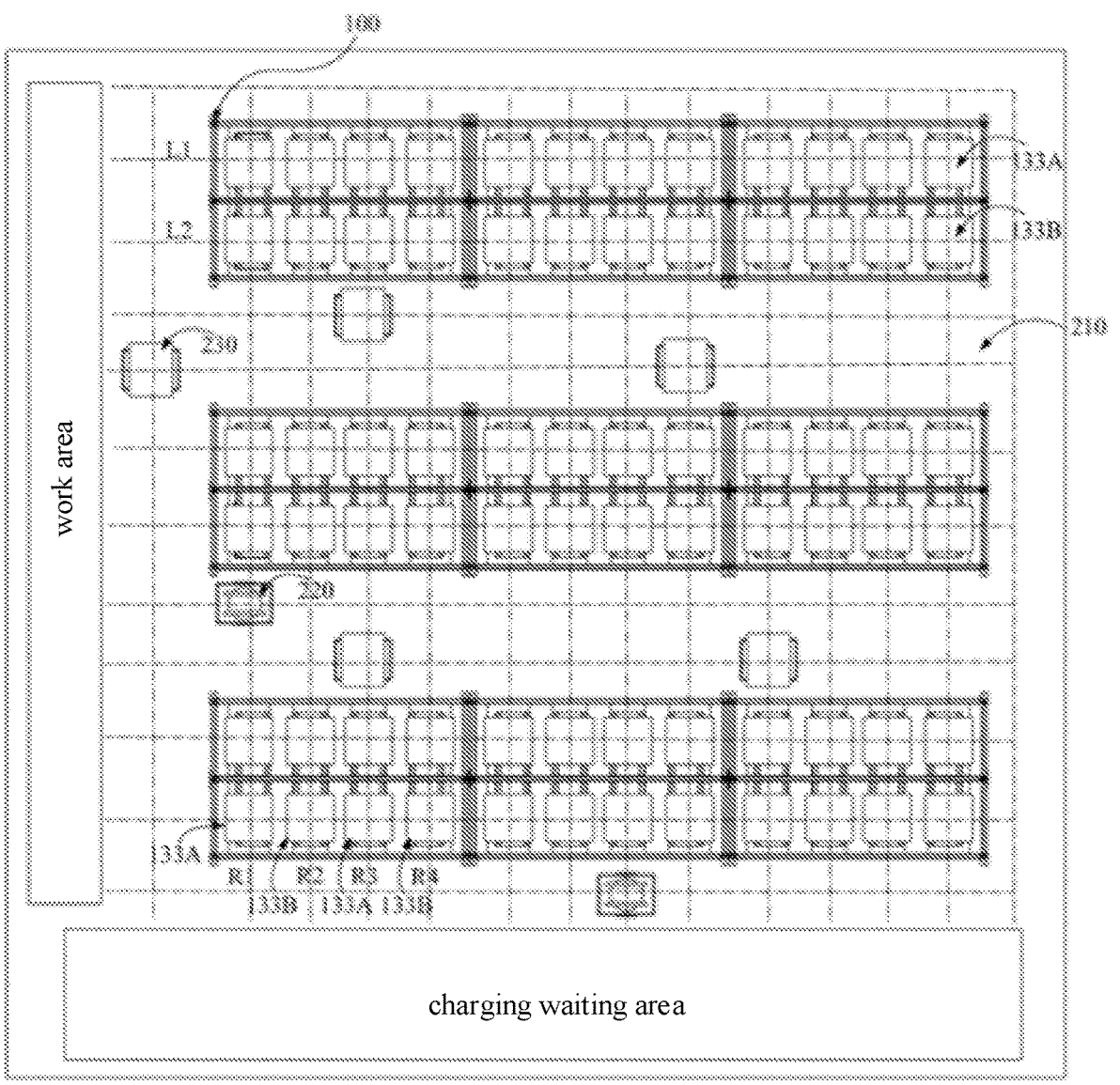
FIG. 4B shows a schematic view of a scenario according to an embodiment of the present application.

In an implementation, as shown in FIG. 4B, the first temporary storage position 133A and the second temporary storage position 133B are arranged adjacent to each other.

Exemplarily, as shown in FIG. 4B, a plurality of racks 100 are arranged in rows and columns, so that the temporary storage positions 133 are arranged in 6 rows and 12 columns. In one example, the first temporary storage position 133A and the second temporary storage position 133B may be arranged adjacent to each other along the width direction of the rack 100, and for example, the temporary storage position 133 located in the first row L1 is set as the first temporary storage position 133A, and the temporary storage position 133 located in the second row L2 is set as the second temporary storage position 133B. In this way, the first robot 220 and the second robot may travel along the length direction of the rack 100 at two sides of the rack 100 respectively, so that the passage occupation between the first robot 220 and the second robot is reduced, which is beneficial to improve the inbound and outbound efficiency in a scenario with low goods traffic.

Alternatively, in another example, the first temporary storage position 133A and the second temporary storage position 133B may be arranged adjacent to each other along the length direction of the rack 100, and for example, the temporary storage positions 133 located in the first column R1 and the third column R3 are set as the first temporary storage positions 133A, and the temporary storage positions 133 located in the second column R2 and the fourth column R4 are set as the second temporary storage positions 133B, which is beneficial to improve the efficiency of the first robot 220 and the second robot for transferring goods using the first storage positions 133A and the second temporary storage positions 133B, and is beneficial to improve the inbound and outbound efficiency in a scenario with high goods traffic.

FIG. 5 shows a schematic flowchart of an outbound control method according to a fifth embodiment of the present application. The outbound control method is applicable to the rack according to any of the above implementations. As shown in FIG. 5, the control method may include the following steps S501-S504.

S501: determining, according to hit counts of goods in order information, target goods for which the hit count satisfies a threshold condition.

Herein, for the manner for determining the target goods, reference may be made to the manner for determining the first target goods in the inbound control method as described above, which is not repeated herein.

S502: determining, according to a storage position where the target goods is located, a corresponding target temporary storage position.

Exemplarily, determining the target temporary storage position may include: determining a temporary storage position closest to the storage position where the target goods is located as the target temporary storage position for the target goods.

S503: instructing, at a first moment, a second robot to move the target goods from the storage position where the target goods is located to the target temporary storage position.

S504: instructing, at a second moment, a first robot to move the target goods from the target temporary storage position to a work area for moving out the target goods, in which the second moment is later than the first moment.

Exemplarily, the first moment may be 20:00 of the first day, and the second moment may be 8:00 of the second day. At 20:00 of the first day, the second robot is instructed to move the target goods to the target temporary storage position, and at 8:00 of the second day, the first robot is instructed to move the target goods to the work area.

At 8:00 of the second day, the second robot may be further instructed to move the target goods, which has not been moved, to the target temporary storage position, or the second robot may be instructed to move the goods for which the hit count does not satisfy the threshold condition from the temporary storage position to the storage position, or the second robot may be instructed to be charged in a charging waiting area. In this way, the second robot can be fully utilized.

In the above solution, the second robot is instructed, at the first moment, to move the target goods from the storage position to the target temporary storage position, and the first robot is instructed, at the second moment, to move the target goods from the target temporary storage position to the work area, thus the configured number of the second robots is reduced by prolonging the work time of the second robots, the utilization of the second robot can be increased, which is beneficial to reduce the inbound and outbound costs of the goods.

FIG. 6 shows a structural block diagram of an inbound control apparatus 600 according to a sixth embodiment of the present application. The inbound control apparatus 600 is applicable to the rack according to any of the above implementations. As shown in FIG. 6, the inbound control apparatus 600 may include: a first determination module 610 configured to determine, according to hit counts of goods in order information, first target goods for which the hit count satisfies a threshold condition; a first instruction module 620 configured to instruct a first robot to move the first target goods to a first temporary storage position; and a second instruction module 630 configured to instruct, under a condition that a hit instruction for the first target goods is monitored, the first robot to move the first target goods from the first temporary storage position to a work area for moving out the first target goods.

In an implementation, the inbound control apparatus 600 may further include: a second determination module configured to determine, according to the hit counts of goods in the order information, second target goods for which the hit count does not satisfy the threshold condition; a third instruction module configured to instruct the first robot to move the second target goods to a second temporary storage position; and a fourth instruction module configured to instruct, under a condition that a moving completion signal sent by the first robot is received, a second robot to move the second target goods from the second temporary storage position to a target storage position corresponding to the second target goods.

Figure 7:
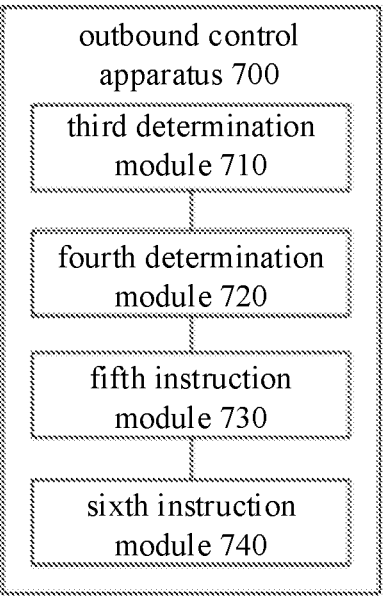
FIG. 7 shows a structural block diagram of an outbound control apparatus according to a seventh embodiment of the present application.

FIG. 7 shows a structural block diagram of an outbound control apparatus 700 according to a seventh embodiment of the present application. The outbound control apparatus 700 is applicable to the rack according to any of the above implementations. As shown in FIG. 7, the outbound control apparatus 700 may include: a third determination module 710 configured to determine, according to hit counts of goods in order information, target goods for which the hit count satisfies a threshold condition; a fourth determination module 720 configured to determine, according to a storage position where the target goods is located, a corresponding target temporary storage position; a fifth instruction module 730 configured to instruct, at a first moment, a second robot to move the target goods from the storage position where the target goods is located to the target temporary storage position; and a sixth instruction module 740 configured to instruct, at a second moment, a first robot to move the target goods from the target temporary storage position to a work area for moving out the target goods, in which the second moment is later than the first moment.

For the functions of the various modules in the various apparatuses of the embodiments of the present application, reference may be made to the corresponding description in the above methods, which are not repeated herein.

Figure 8:
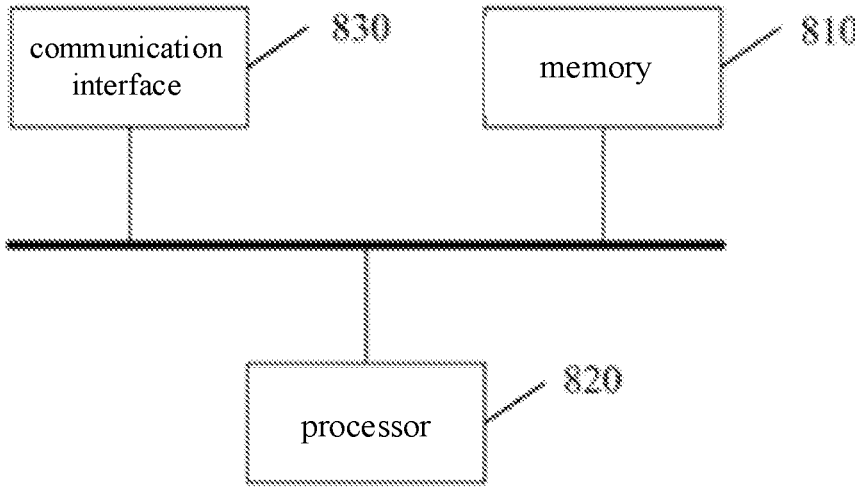
FIG. 8 shows a structural block diagram of an electronic device according to an eighth embodiment of the present application.

FIG. 8 shows a structural block diagram of an electronic device according to an eighth embodiment of the present application. As shown in FIG. 8, the electronic device includes: a memory 810 and a processor 820, in which the memory 810 stores a computer program which can be executed on the processor 820. The processor 820, when executing the computer program, implements the methods in the above embodiments. The number of the memory 810 and the processor 820 may be one or more.

The electronic device further includes: a communication interface 830 for communicating with an external device for data interactive transmission.

If the memory 810, the processor 820, and the communication interface 830 are implemented independently, then the memory 810, the processor 820, and the communication interface 830 may be connected and communicate with each other through a bus. The bus may be an Industry Standard Architecture (ISA) bus, a Peripheral Component Interconnect (PCI) bus, or an Extended Industry Standard Architecture (EISA) bus, etc. The bus may include an address bus, a data bus, a control bus, etc. For ease of illustration, only one bold line is shown in FIG. 8, but it does not mean that there is only one bus or one type of bus.

Optionally, in a specific implementation, if the memory 810, the processor 820, and the communication interface

830 are integrated onto a single chip, then the memory 810, the processor 820, and the communication interface 830 may communicate with each other through internal interfaces.

The embodiments of the present application provide a computer readable storage medium storing a computer program, in which the computer program, when executed by the processor 820, implements the methods according to the embodiments of the present application.

The embodiments of the present application further provide a chip including the processor 820 for calling and running, from the memory 810, the instructions stored in the memory 810, so as to cause an electronic device on which the chip is installed to perform the methods according to the embodiments of the present application.

The embodiments of the present application further provide a chip including: an input interface, an output interface, the processor 820 and the memory 810, which are connected through an internal connection path, in which the processor 820 is configured to execute a code in the memory 810, and when the code is executed, the processor 820 is configured to perform the methods according to the embodiments of the present application.

It should be appreciated that the above processor 820 may be a central processing unit (CPU) or other general purpose processor, a digital signal processor (DSP), an application specific integrated circuit (ASIC), a field programmable gate array (FPGA) or other programmable logic device, a discrete gate or transistor logic device, a discrete hardware component, etc. The general purpose processor may be a microprocessor or any conventional processor, etc. Note that the processor 820 may be a processor that supports the Advanced RISC Machines (ARM) architecture.

Further, the above memory 810 may optionally include a read-only memory and a random access memory, or a non-volatile random access memory. The memory 810 may be a volatile memory or a non-volatile memory, or may include both the volatile and non-volatile memory. Herein, the non-volatile memory may include a read-only memory (ROM), a programmable read-only memory (PROM), an erasable programmable read-only memory (EPROM), an electrically-erasable programmable read-only memory (EEPROM) or a flash memory. The volatile memory may include a random access memory (RAM) used as an external high-speed cache. By way of exemplary but not limiting illustration, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), and a direct rambus random access memory (DRRAM).

The above embodiments may be implemented, in whole or in part, through software, hardware, firmware, or any combination thereof. When software is used, the above embodiments may be implemented, in whole or in part, in form of a computer program product. The computer program product includes one or more computer instructions. When the computer program instructions are loaded and executed on a computer, the flows or functions according to the present application are produced in whole or in part. The computer may be a general purpose computer, a special purpose computer, a computer network, or other programmable apparatuses. The computer instructions may be stored in a computer readable storage medium, or transmitted from one computer readable storage medium to another computer readable storage medium.

In the specification, the description with reference to terms "one embodiment", "some embodiments", "an example", "a specific example", or "some examples", and the like means that the specific feature, structure, material, or characteristic described in combination with the embodiment or example is included in at least one embodiment or example of the present application. Furthermore, the specific feature, structure, material, or characteristic as described may be combined in any suitable manner in any one or more embodiments or examples. Furthermore, those skilled in the art can incorporate or combine different embodiments or examples, as well as features in the different embodiments or examples, under a condition that they do not contradict each other.

Furthermore, the terms "first", "second" and the like are used for description only and should not to be construed as indicating or implying relative importance or implicitly indicating the number of the technical features as indicated. Thus, a feature defined by "first" or "second" and the like may explicitly or implicitly include at least one such feature. In the description of the present application, term "a plurality of" means two or more, unless otherwise explicitly and specifically defined.

Any process or method described in the flowcharts or otherwise described herein may be understood as a module, segment, or portion of a code of executable instructions including one or more steps for implementing a particular logical function or process. In addition, the scope of the preferred implementations of the present application includes additional implementations, in which the functions may be performed in an order different from the order as shown or discussed, and for example, the functions may be performed substantially simultaneously or in a reverse order, depending on the functions related.

For example, the logic and/or steps represented in the flowcharts or otherwise described herein may be considered as a ordered list of executable instructions for implementing logical functions, and may be implemented in any computer readable medium for use by or in connection with an instruction execution system, apparatus, or device, such as a computer-based system, a system including a processor, or other system that can fetch instructions from the instruction execution system, apparatus, or device and execute the instructions.

It should be understood that portions of the present application may be implemented in hardware, software, firmware, or a combination thereof. In the above implementations, a plurality of steps or methods may be implemented with software or firmware stored in a memory and executed by an appropriate instruction execution system. All or a portion of the steps of the above embodiment methods may be completed by instructing related hardware through a program, which may be stored in a computer readable storage medium, and the program, when executed, includes one or a combination of the steps of the method embodiments.

Furthermore, the functional units in various embodiments of the present application may be integrated into one processing module, or the functional units may physically exist separately, or two or more of the functional units may be integrated into one module. The above integrated module may be implemented in a form of hardware or in a form of software functional module. The above integrated module, if implemented in the form of software functional module and sold or used as a stand-alone product, may also be stored in a computer readable storage medium. The storage medium may be a read-only memory, a magnetic or optical disk, and the like.

The above provides only specific implementations of the present application, while the protection scope of the present application is not limited thereto. Any person skilled in the art can easily think of various changes or substitutions within the technical scope disclosed in the present application, all of which should be within the protection scope of the present application. Therefore, the protection scope of the present application should be subject to the protection scope of the claims.

What is claimed is:

1. A rack, comprising:
a plurality of first uprights and a plurality of second uprights arranged at intervals along a circumference of the rack, the first upright being located between two of the second uprights in a width direction of the rack;
at least one temporary storage layer plate comprising a first cross beam arranged along a horizontal direction and a plurality of temporary storage members arranged at intervals along two sides of the first cross beam, two ends of the first cross beam being respectively arranged at two of the first uprights, the temporary storage member comprising two support arms and a fork slot formed between the two support arms, and the temporary storage layer plate being configured to provide a plurality of temporary storage positions; and
at least one storage layer plate spaced apart from the temporary storage layer plate in a vertical direction through the first uprights and the second uprights, and configured to provide a plurality of storage positions, wherein the temporary storage layer plate further comprises:
a plurality of fixing plates each connected between adjacent temporary storage members and connected to the first cross beam; and
a plurality of wedge plates each connected between adjacent temporary storage members and arranged at an end of the support arm away from the first cross beam.

2. The rack according to claim 1, wherein the plurality of temporary storage members are detachable from the first cross beam.

3. The rack according to claim 1, wherein the first cross beam is detachable from the first uprights.

4. The rack according to claim 1, wherein the temporary storage position is formed by the support arms of the temporary storage member or formed by adjacent support arms from adjacent temporary storage members.

5. The rack according to claim 1, wherein an access passage for placing a first robot is formed under the temporary storage layer plate; and when goods are to be accessed and the first robot is located in the access passage, the fork slot cooperates with a fork arm on the first robot to access the goods.

6. The rack according to claim 5, wherein the access passage is further configured for the first robot to travel without goods.

7. The rack according to claim 5, wherein the second uprights are arranged at the periphery of the temporary storage layer plate and the storage layer plate, and a first travel passage for the first robot to travel is formed at a side of the second uprights away from the temporary storage layer plate.

8. A warehousing apparatus, comprising:
a plurality of racks according to claim 1; and
a second travel passage for a second robot to travel, the second travel passage being formed between adjacent racks, and the second robot being configured to move goods between the temporary storage layer plate and the storage layer plate.

9. An inbound control method applicable to the rack according to claim 1, the control method comprising:
determining, according to hit counts of goods in order information, first target goods for which the hit count satisfies a threshold condition;
instructing a first robot to move the first target goods to a first temporary storage position; and
instructing, under a condition that a hit instruction for the first target goods is monitored, the first robot to move the first target goods from the first temporary storage position to a work area for moving out the first target goods.

10. The method according to claim 9, further comprising:
determining, according to the hit counts of goods in the order information, second target goods for which the hit count does not satisfy the threshold condition;
instructing the first robot to move the second target goods to a second temporary storage position; and
instructing, under a condition that a moving completion signal sent by the first robot is received, a second robot to move the second target goods from the second temporary storage position to a target storage position corresponding to the second target goods.

11. An electronic device comprising: a processor and a memory storing instructions, wherein the instructions are loaded and executed by the processor to implement the method according to claim 9.

12. A computer readable storage medium storing a computer program, wherein the computer program, when executed by a processor, implements the method according to claim 9.

13. An outbound control method applicable to the rack according to claim 1, the control method comprising:
determining, according to hit counts of goods in order information, target goods for which the hit count satisfies a threshold condition;
determining, according to a storage position where the target goods is located, a corresponding target temporary storage position;
instructing, at a first moment, a second robot to move the target goods from the storage position where the target goods is located to the target temporary storage position; and
instructing, at a second moment, a first robot to move the target goods from the target temporary storage position to a work area for moving out the target goods, wherein the second moment is later than the first moment.

14. An electronic device comprising: a processor and a memory storing instructions, wherein the instructions are loaded and executed by the processor to implement the method according to claim 13.

15. A computer readable storage medium storing a computer program, wherein the computer program, when executed by a processor, implements the method according to claim 13.

16. An inbound control apparatus applicable to the rack according to claim 1, the control apparatus comprising:
a first determination module configured to determine, according to hit counts of goods in order information, first target goods for which the hit count satisfies a threshold condition;

a first instruction module configured to instruct a first robot to move the first target goods to a first temporary storage position; and a second instruction module configured to instruct, under a condition that a hit instruction for the first target goods is monitored, the first robot to move the first target goods from the first temporary storage position to a work area for moving out the first target goods.

17. The apparatus according to claim 16, further comprising:

a second determination module configured to determine, according to the hit counts of goods in the order information, second target goods for which the hit count does not satisfy the threshold condition;

a third instruction module configured to instruct the first robot to move the second target goods to a second temporary storage position; and a fourth instruction module configured to instruct, under a condition that a moving completion signal sent by the first robot is received, a second robot to move the second target goods from the second temporary storage position to a target storage position corresponding to the second target goods.

18. An outbound control apparatus applicable to the rack according to claim 1, the control apparatus comprising:

a third determination module configured to determine, according to hit counts of goods in order information, target goods for which the hit count satisfies a threshold condition;

a fourth determination module configured to determine, according to a storage position where the target goods is located, a corresponding target temporary storage position;

a fifth instruction module configured to instruct, at a first moment, a second robot to move the target goods from the storage position where the target goods is located to the target temporary storage position; and a sixth instruction module configured to instruct, at a second moment, a first robot to move the target goods from the target temporary storage position to a work area for moving out the target goods, wherein the second moment is later than the first moment.

* * * * *